United States Patent
Morimoto

(10) Patent No.: US 8,124,890 B2
(45) Date of Patent: Feb. 28, 2012

(54) ELECTRONIC DEVICE, METHOD FOR HOLDING ELECTRONIC COMPONENT, AND METHOD FOR MANUFACTURING ELECTRONIC DEVICE

(75) Inventor: Jun Morimoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 409 days.

(21) Appl. No.: 12/361,617

(22) Filed: Jan. 29, 2009

(65) Prior Publication Data

US 2009/0194326 A1    Aug. 6, 2009

(30) Foreign Application Priority Data

Jan. 31, 2008    (JP) .................................. 2008-021908

(51) Int. Cl.
*H05K 7/02* (2006.01)
(52) U.S. Cl. ................ 174/541; 174/544; 206/521
(58) Field of Classification Search .......... 174/544, 174/541; 313/493; 206/521
See application file for complete search history.

(56) References Cited

U.S. PATENT DOCUMENTS

| 5,837,934 A * | 11/1998 | Valavanis et al. ............ 174/544 |
| 6,765,145 B2 * | 7/2004 | Cheynet et al. ............... 174/50 |
| 6,917,517 B1 * | 7/2005 | Iida .............................. 455/347 |
| 2004/0245913 A1 * | 12/2004 | Wakayama .................... 313/493 |
| 2007/0290965 A1 * | 12/2007 | Shiraishi ......................... 345/87 |

FOREIGN PATENT DOCUMENTS

| CN | 101093307 A | 12/2007 |
| JP | 2001-91926 | 4/2001 |
| JP | 2001-147643 | 5/2001 |
| JP | 2005-338497 | 12/2005 |
| JP | 2007-271894 | 10/2007 |

OTHER PUBLICATIONS

Notification of the First Office Action issued by the Chinese Patent Office on May 10, 2010, for Chinese Patent Application No. 200910126756, and English-language translation thereof.
Notification of Reason(s) for Refusal issued by the Japanese Patent Office on Dec. 26, 2011, for Japanese Patent Application No. 2008-021908, and English-language translation thereof.

* cited by examiner

*Primary Examiner* — Hung Ngo
(74) *Attorney, Agent, or Firm* — Finnegan, Henderson, Farabow, Garrett & Dunner, L.L.P.

(57) ABSTRACT

An electronic device includes: a housing; an electronic component provided inside the housing; and a holding member provided between an inner wall of the housing and the electronic component and configured to hold the electronic component. The holding member is configured to hold a first region of a major surface of the electronic component located on a first end surface side, and the holding member is configured not to hold a second region of the major surface of the electronic component located on a second end surface side opposed to the first end surface side.

17 Claims, 10 Drawing Sheets

ELECTRONIC DEVICE, METHOD FOR HOLDING ELECTRONIC COMPONENT, AND METHOD FOR MANUFACTURING ELECTRONIC DEVICE

CROSS-REFERENCE TO RELATED APPLICATIONS

This application is based upon and claims the benefit of priority from the prior Japanese Patent Application No. 2008-021908, filed on Jan. 31, 2008; the entire contents of which are incorporated herein by reference.

BACKGROUND OF THE INVENTION

1. Field of the Invention

This invention relates to an electronic device, a method for holding an electronic component, and a method for manufacturing an electronic device.

2. Background Art

An electronic device including electronic components, such as a display panel (e.g., a flat display panel such as a liquid crystal display panel and an organic EL display panel) and a circuit substrate, needs to be configured so that the internal electronic components are not damaged by impact and the like.

In particular, a portable electronic device, which the user drops rather frequently by accident, needs to be protected from damage to its electronic components due to drop impact.

In this context, JP-A-2007-271894 (Kokai) discloses a technique of sticking a display panel to the bottom of a housing a double-faced tape shaped like a rectangular frame. The technique disclosed in JP-A-2007-271894 (Kokai) does not use a holding method of pressing a display panel with hooks and the like. Hence, there arises no concentrated stress that may occur at portions in abutment with hooks and the like, does not occur. Thus, no concentrated stress is applied to the display panel under impact, and damage thereto can be prevented.

However, in the technique disclosed in JP-A-2007-271894 (Kokai), the entire periphery of the display panel is stuck to the bottom of the housing a double-faced tape shaped like a rectangular frame. Hence, when the housing undergoes large deformation due to a large impact force, the entire surface of the display panel (electronic component) is greatly deformed in conformity with the deformation of the housing, and the display panel (electronic component) may be damaged.

SUMMARY OF THE INVENTION

According to an aspect of the invention, there is provided an electronic device including: a housing; an electronic component provided inside the housing; and a holding member provided between an inner wall of the housing and the electronic component and configured to hold the electronic component, the holding member being configured to hold a first region of a major surface of the electronic component located on a first end surface side, and the holding member being configured not to hold a second region of the major surface of the electronic component located on a second end surface side opposed to the first end surface side.

According to another aspect of the invention, there is provided an electronic device including: a housing; an electronic component provided inside the housing; a first holding member provided between an inner wall of the housing and the electronic component and configured to hold a first region of a major surface of the electronic component located on a first end surface side; and a second holding member provided between the inner wall of the housing and the electronic component and configured to hold a second region of the major surface of the electronic component located on a second end surface side opposed to the first end surface side, the second holding member being more elastically deformable than the first holding member.

According to another aspect of the invention, there is provided a method for holding an electronic component, including: holding a first region of a major surface of the electronic component located on a first end surface side, without holding a second region of the major surface located on a second end surface side opposed to the first end surface side.

According to another aspect of the invention, there is provided a method for holding an electronic component, including: using a first holding member to hold a first region of a major surface of the electronic component located on a first end surface side; and using a second holding member to hold a second region of the major surface located on a second end surface side opposed to the first end surface side, the second holding member being more elastically deformable than the first holding member.

According to another aspect of the invention, there is provided a method for manufacturing an electronic device, including: holding an electronic component in a housing by a method for holding an electronic component, the method for holding an electronic component, including: holding a first region of a major surface of the electronic component located on a first end surface side, without holding a second region of the major surface located on a second end surface side opposed to the first end surface side.

DETAILED DESCRIPTION OF THE INVENTION

Figure 1A:
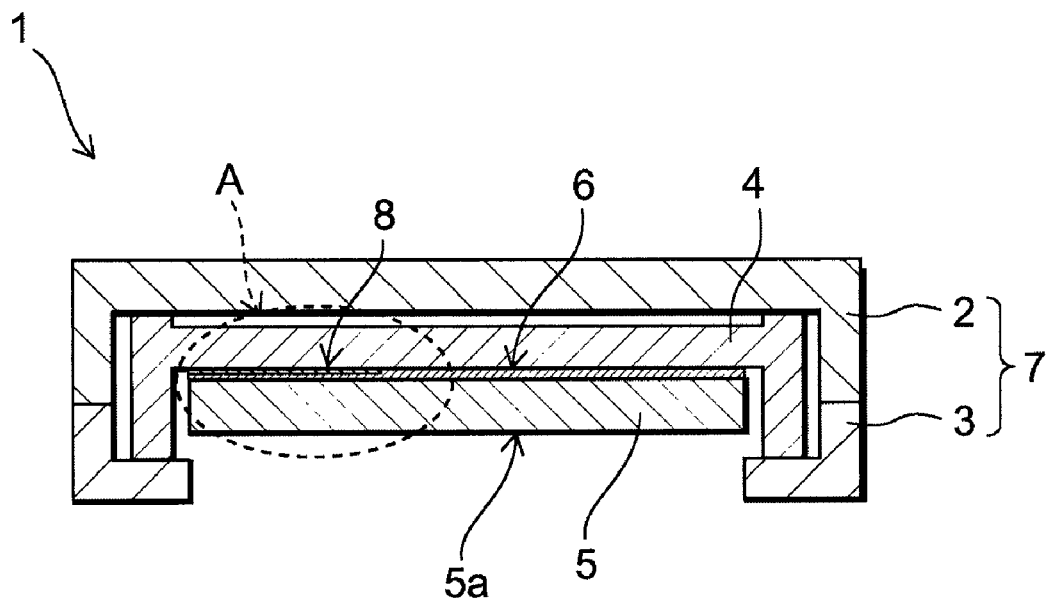
FIGS. 1A and 1B are schematic cross-sectional views for illustrating a holding structure for an electronic component according to a first embodiment of the invention.

Embodiments of the invention will now be described with reference to the drawings. In the drawings, like components are labeled with like reference numerals, and the detailed description thereof is omitted as appropriate.

FIG. 1 is a schematic cross-sectional view for illustrating a holding structure for an electronic component according to a first embodiment of the invention.

FIG. 2 is a schematic cross-sectional view for illustrating a holding structure for an electronic component according to a comparative example.

Figure 2A:
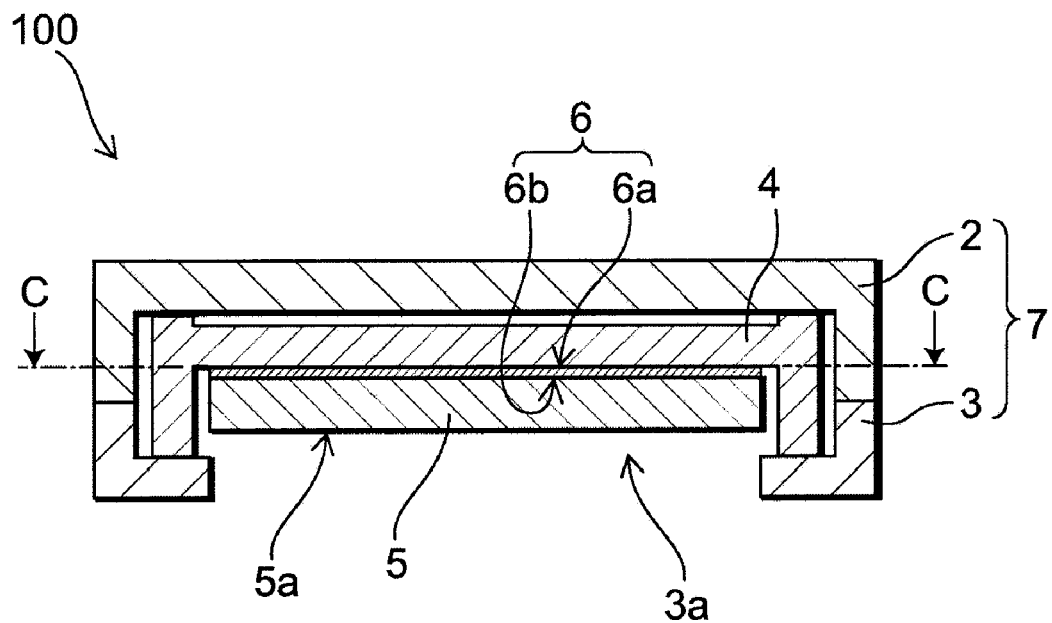
FIGS. 2A and 2B are schematic cross-sectional views for illustrating a holding structure for an electronic component according to a comparative example.
Figure 2B:
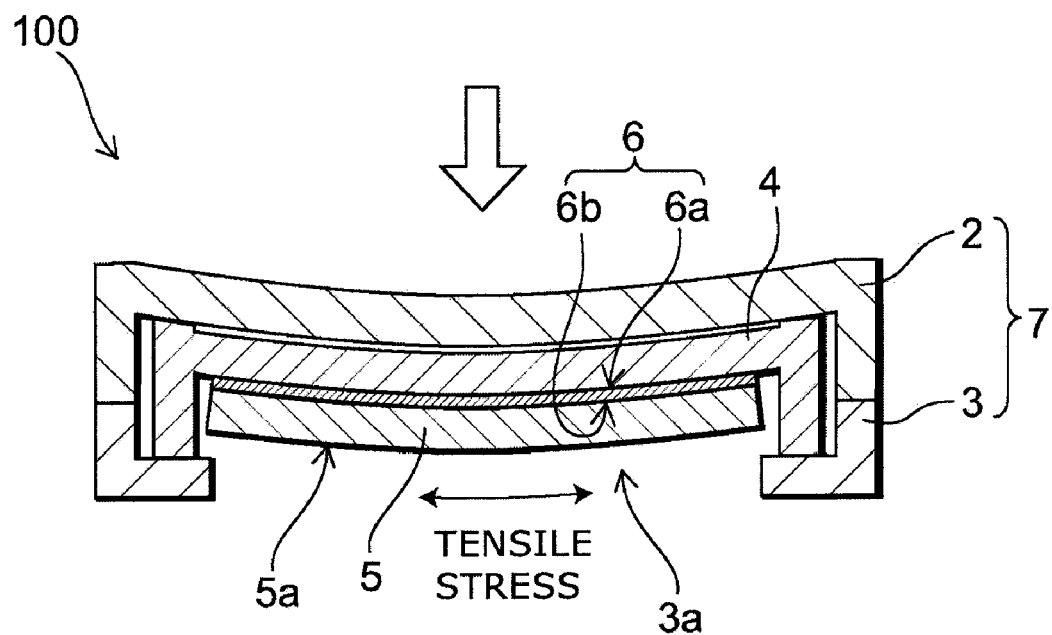

Here, FIG. 2A shows the state before deformation due to impact, and FIG. 2B shows the state at the moment of deformation due to impact.

First, the comparative example illustrated in FIG. 2 is described.

For convenience of description, the electronic component incorporated in the electronic device is assumed to be a flat-panel display panel (hereinafter simply referred to as a display panel) such as a liquid crystal display panel and an organic EL display panel.

The comparative example illustrated in FIG. 2 is an example investigated by the inventor in the course of making the invention.

As shown in FIG. 2, the electronic device 100 includes a housing 7. The housing 7 includes a housing unit 2 and a housing unit 3 having a generally square-U shaped cross section opening on one side, and is integrated by joining the peripheries on the opening side of the housing unit 2 and the housing unit 3 with each other. A support unit 4 and a display panel 5 are provided inside the housing 7. The support unit 4 is provided on the major surface of the housing unit 2 located on the inner side of the housing 7. Here, the support unit 4 can be provided on the major surface of the housing unit 2 illustratively by adhesive bonding, screwing, or fitting. A window 3a is provided in the major surface of the housing unit 3 so that the display section 5a of the display panel 5 provided inside the housing 7 is visible through the window 3a. In addition, other components, not shown, such as a circuit substrate, an operation switch, a power supply, and a wiring member, are provided as appropriate.

A holding member 6 is provided on the major surface of the support unit 4 and serves to hold the display panel 5 on the major surface of the support unit 4. Here, in view of reduction in the profile of the electronic device 100, it is preferable to minimize the thickness dimension of the holding member 6. Furthermore, in view of assemblability and repairability, it is preferable that the display panel 5 be easily held and detachable from the holding member 6. Moreover, it is preferable that the holding member 6 relieve impact and vibration applied to the electronic device 100.

In view of the foregoing, the holding member 6 can illustratively be a double-faced tape. That is, the holding member 6 can be made of a resin layer and bonding layers provided on both sides of the resin layer. In this case, the holding member 6 has a first bonding surface 6a and a second bonding surface 6b opposite to the first bonding surface 6a. The first bonding surface 6a is bonded to the major surface of the support unit 4, and the second bonding surface 6b is bonded to the major surface of the display panel 5 opposite to the display section 5a side, so that the display panel 5 is held on the major surface of the support unit 4. Here, in the case where the holding member 6 is a double-faced tape, its thickness can be approximately 0.1 mm.

Figure 3A:
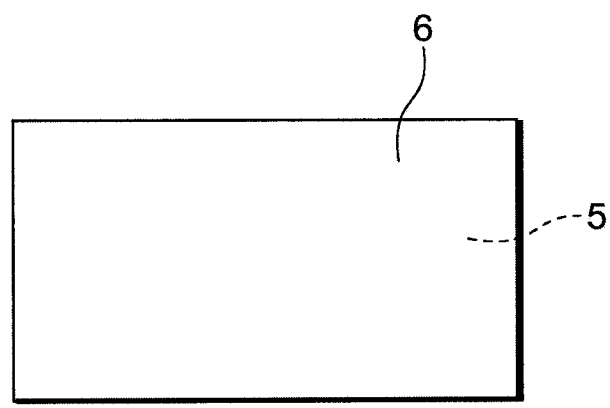
FIGS. 3A and 3B are schematic plan views of the holding member 6.
Figure 3B:
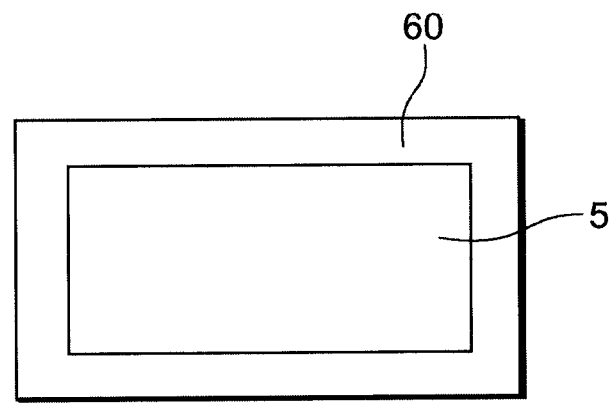

FIG. 3 is a schematic plan view of the holding member 6. More specifically, FIG. 3A shows a cross section as viewed from the direction of arrows C-C in FIG. 2A, and FIG. 3B illustrates a variation.

As shown in FIG. 3A, in the electronic device 100 according to the comparative example, the major surface of the display panel 5 opposite to the display section 5a is entirely held (bonded) by a double-faced tape serving as the holding member 6. Alternatively, as shown in FIG. 3B, the holding member 60 can be shaped like a rectangular frame to hold (bond) the entire outer periphery of the display panel 5. Thus, at least the entire outer periphery of the display panel 5 is held on the housing 7 via the support unit 4.

Here, the electronic device 100 according to the comparative example does not use a holding method of pressing a display panel 5 with hooks and the like. Hence, there arises no concentrated stress that may occur at portions in abutment with hooks and the like even when the electronic device 100 undergoes impact. Thus, damage to the display panel 5 can be prevented. Furthermore, the elasticity of the double-faced tape serving as the holding member 6 serves to relieve the impact force, vibration and the like.

However, for example, in such a case where the electronic device 100 is dropped in the direction of the arrow in FIG. 2B, a large impact force occurs due to collision with the floor or the like, and hence the housing 7 also undergoes a large amount of deformation. Furthermore, in such a case where the support unit 4 is provided inside the housing 7, the amount of deformation may further increase due to a larger inertial force.

In such cases, when the housing 7 is greatly deformed, the entire surface of the display panel 5 is also greatly deformed in conformity with the deformation of the housing 7 via the support unit 4 because at least the entire outer periphery of the display panel 5 is held (bonded). Then, as shown in FIG. 2B, the display panel 5 is curved in a downward convex direction. Hence, a large impact stress (tensile stress) acts on the vicinity of the center of the display panel 5 on the display section 5a side. Furthermore, a large impact stress (compressive stress) also acts on the side opposite to the display section 5a. Consequently, the portion made of a brittle material (such as a glass substrate portion) provided in the display panel 5, for example, may be damaged by this impact stress. In particular, a portable electronic device, which the user drops rather frequently by accident, is likely to suffer damage to its electronic components due to drop impact.

Figure 4:
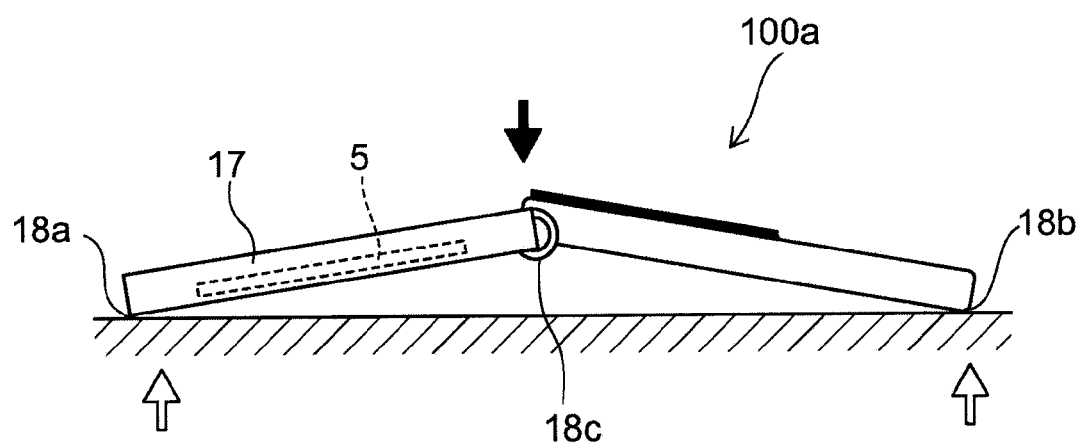
FIG. 4 is a schematic side view for illustrating the collision of a portable electronic device with the floor.

FIG. 4 is a schematic side view for illustrating the collision of a portable electronic device with the floor.

Figure 5:
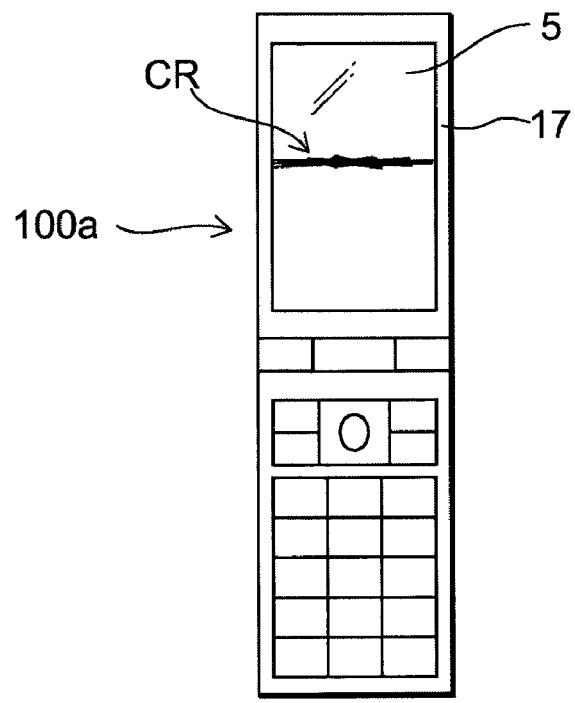
FIG. 5 is a schematic front view for illustrating damage to the display panel.

FIG. 5 is a schematic front view for illustrating damage to the display panel.

A folding portable electronic device 100a known as the clamshell type is composed of a housing including a control section and a housing including a display section 5a, which can be doubly folded. For operation or other purposes, the portable electronic device 100a may be opened to unfold the housings. In this case, they are unfolded not at 180°, but with a smaller prescribed angle provided between the two housings for operability and other reasons.

In such a case where the portable electronic device 100a is dropped in this unfolded state, it may touch down so that the end portion 18a of the housing including the display panel 5 and the end portion 18b of the housing including the control section abut the floor as shown in FIG. 4. For larger impact at the drop collision, the hinge opens beyond the preset amount, and hence the portable electronic device 100a may touch down so that the hinge 18c abuts the floor in addition to the end portion 18a and the end portion 18b. When the portable electronic device 100a collides with the floor in such conditions, the housings are curved in a downward convex direction due to the inertial force, with the end portion 18a and the end portion 18b, or the end portion 18a, the end portion 18b, and the hinge 18c serving as fulcrums. That is, this results in the state as shown in FIG. 2B.

Thus, like that described with reference to FIG. 2B, a large impact stress acts on the vicinity of the center of the display panel 5. Consequently, as shown in FIG. 5, a crack CR may occur in, for example, the portion made of a brittle material (such as a glass substrate portion) provided in the display panel 5.

Figure 6:
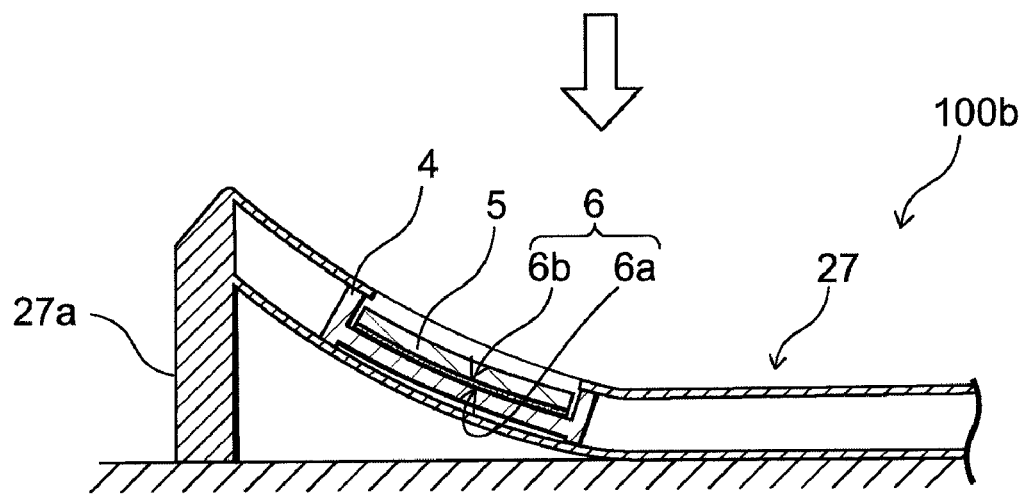
FIG. 6 is a schematic cross-sectional view for illustrating the collision of another electronic device with the floor.

FIG. 6 is a schematic cross-sectional view for illustrating the collision of another electronic device with the floor.

As shown in FIG. 6, the electronic device 100b includes a housing 27, and a protrusion 27a is provided at the end portion of one major surface of the housing 27. The protrusion 27a serves to facilitate operation from above and viewing of the display panel by tilting the major surface when the electronic device 100b is put on a desk or the like.

Like that illustrated in FIG. 2, a support unit 4 and a display panel 5 are provided inside the housing 27. The support unit 4 is fixed inside the housing 27 illustratively by adhesive bonding, screwing, or fitting. A window 27b is provided in the major surface of the housing 27 so that the display section 5a of the display panel 5 provided inside the housing 27 is visible through the window 27b. A holding member 6 is provided on the major surface of the support unit 4 and serves to hold the display panel 5 on the major surface of the support unit 4. In addition, other components, not shown, such as a circuit substrate, an operation switch, a power supply, and a wiring member, are provided as appropriate.

Also in the case of the electronic device 100b, the holding member 6 can be a double-faced tape. In this case, the holding member 6 has a first bonding surface 6a and a second bonding surface 6b opposite to the first bonding surface 6a. The first bonding surface 6a is bonded to the major surface of the support unit 4, and the second bonding surface 6b is bonded to the major surface of the display panel 5 opposite to the display section 5a side, so that the display panel 5 is held on the major surface of the support unit 4. Here, in the case where the holding member 6 is a double-faced tape, its thickness can be approximately 0.1 mm.

Furthermore, the major surface of the display panel 5 opposite to the display section 5a side is entirely held (bonded) by a double-faced tape serving as the holding member 6. Alternatively, like that shown in FIG. 3B, the holding member can be shaped like a rectangular frame to hold (bond) the entire outer periphery of the display panel 5. Thus, at least the entire outer periphery of the display panel 5 is held (bonded) on the housing 27 via the support unit 4.

Also in such a case where the electronic device 100b like this is dropped in the direction of the arrow in the figure, the housing 27 is greatly deformed by the impact force due to collision with the floor or the like. Furthermore, in such a case where the support unit 4 is provided inside the housing 27, the amount of deformation may further increase due to a larger inertial force.

In this case, when the housing 27 is greatly deformed, the entire surface of the display panel 5 is also greatly deformed in conformity with the deformation of the housing 27 via the support unit 4 because at least the entire outer periphery of the display panel 5 is held (bonded). Then, also in the case shown in FIG. 6, the display panel 5 is curved in a downward convex direction. Hence, a large impact stress (compressive stress) acts on the vicinity of the center of the display panel 5 on the display section 5a side. Furthermore, a large impact stress (tensile stress) also acts on the side opposite to the display section 5a. Consequently, also in the case of the electronic device 100b, the portion made of a brittle material (such as a glass substrate portion) provided in the display panel 5, for example, may be damaged by this impact stress.

Next, returning to FIG. 1, a holding structure for an electronic component according to the embodiment of the invention is illustrated.

Figure 1B:
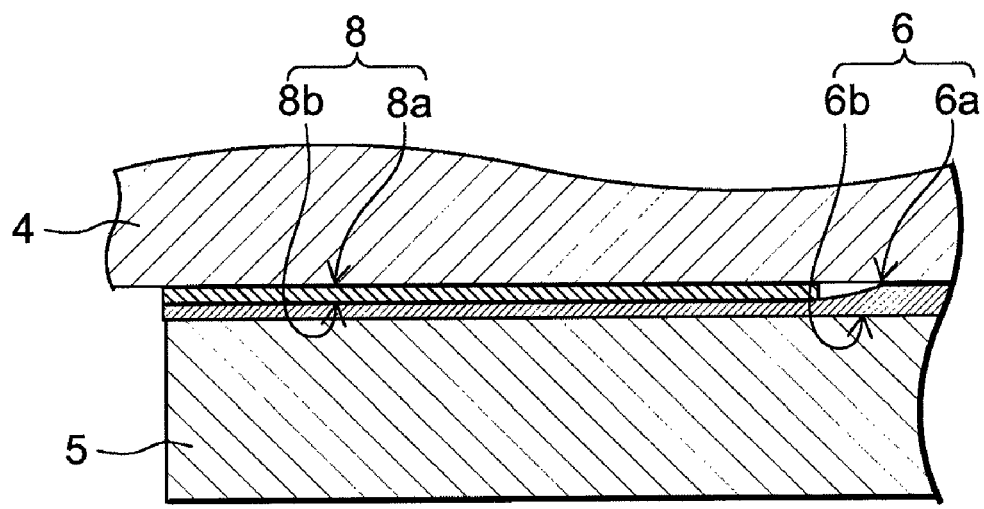

FIG. 1A shows the holding structure for the electronic component according to the embodiment of the invention, and FIG. 1B is a schematic enlarged view of portion A in FIG. 1A.

As shown in FIG. 1A, the electronic device 1 includes a housing 7. The housing 7 includes a housing unit 2 and a housing unit 3 having a generally square-U shaped cross section opening on one side, and is integrated by joining the peripheries on the opening side of the housing unit 2 and the housing unit 3 with each other. A support unit 4 and a display panel 5 are provided inside the housing 7. The support unit 4 is provided on the major surface of the housing unit 2 located on the inner side of the housing 7, and can be provided illustratively by adhesive bonding, screwing, or fitting. A window 3a is provided in the major surface of the housing unit 3 so that the display section 5a of the display panel 5 provided inside the housing 7 is visible through the window 3a. In addition, other components, not shown, such as a circuit substrate, an operation switch, a power supply, and a wiring member, are provided as appropriate.

A holding member 6 is provided on the major surface of the support unit 4 and serves to hold the display panel 5 on the major surface of the support unit 4. As described above, the holding member 6 can illustratively be a double-faced tape. In this case, the holding member 6 has a first bonding surface 6a and a second bonding surface 6b opposite to the first bonding surface 6a. The first bonding surface 6a is bonded to the major surface of the support unit 4, and the second bonding surface 6b is bonded to the major surface of the display panel 5 opposite to the display section 5a side, so that the display panel is held on the major surface of the support unit 4. Here, in the case where the holding member 6 is a double-faced tape, its thickness can be approximately 0.1 mm.

Here, in this embodiment, a stress relieving member 8 is provided on part of the first bonding surface 6a. The stress relieving member 8 can illustratively be a sheet-like member having a first surface 8a and a second surface 8b opposite to the first surface 8a as shown in FIG. 1B. The second surface 8b is bonded to the first bonding surface 6a, and the first surface 8a is allowed to abut the major surface of the support unit 4.

The stress relieving member 8 has a small thickness, and at least the first surface 8a is a non-adhesive surface. Thus, by providing the stress relieving member 8 on the major surface of the holding member 6, the holding force (bonding force) of the holding member 6 can be eliminated. The thickness dimension of the stress relieving member 8 can be approximately 50 to 100 μm, for example.

Hence, the first bonding surface 6a of the holding member 6 is bonded to the major surface of the support unit 4 in its portion where the stress relieving member 8 is not provided. Here, because the thickness of the stress relieving member 8 is small, the stress relieving member 8 abuts the major surface of the support unit 4 while the aforementioned portion of the first bonding surface 6a is bonded to the major surface of the support unit 4. That is, in the portion where the stress relieving member 8 is provided, the first bonding surface 6a is not bonded to the major surface of the support unit 4, but the display panel 5 abuts the support unit 4 via the stress relieving member 8 and the holding member 6.

FIG. 7 is a schematic cross-sectional view for illustrating the state at the moment of deformation due to impact.

Figure 7A:
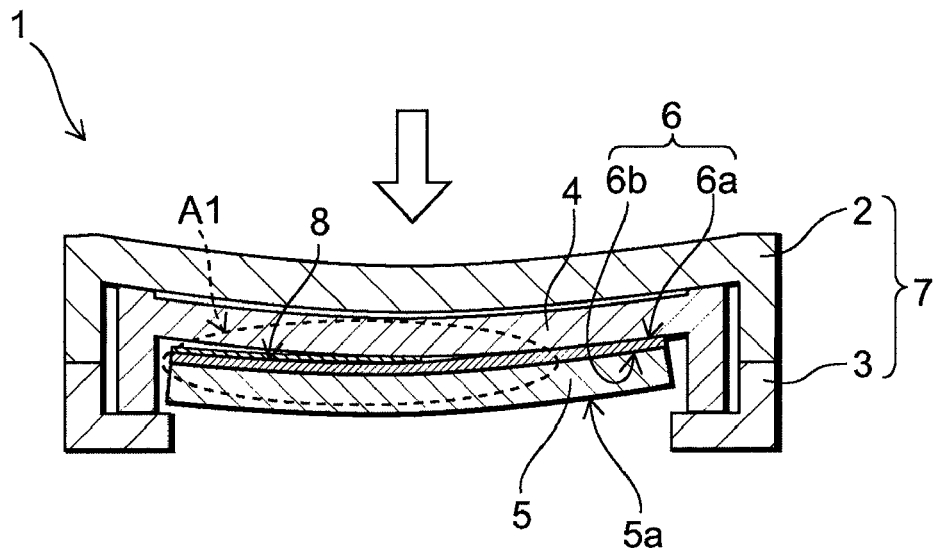
FIGS. 7A and 7B are schematic cross-sectional views for illustrating the state at the moment of deformation due to impact.
Figure 7B:
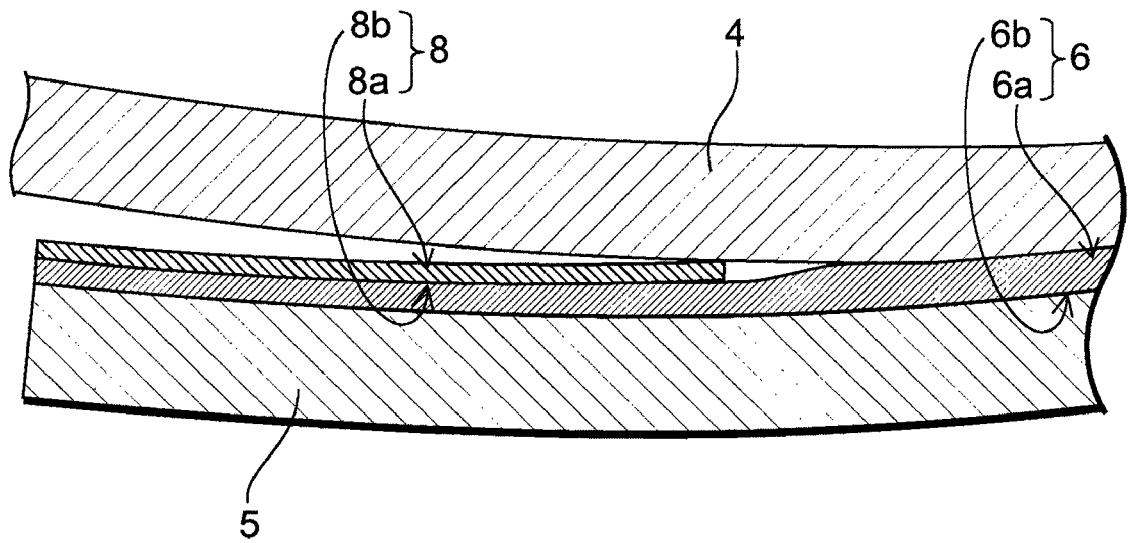

More specifically, FIG. 7A shows the state at the moment of deformation due to impact, and FIG. 7B is a schematic enlarged view of portion A1 in FIG. 7A.

In such a case where the electronic device 1 is dropped in the direction of the arrow in FIG. 7A, a large impact force occurs due to collision with the floor or the like, and hence the housing 7 also undergoes a large amount of deformation. Furthermore, in such a case where the support unit 4 is provided inside the housing 7, the amount of deformation may further increase due to a larger inertial force.

As described above, when the housing 7 is deformed, the display panel 5 is also deformed in conformity with the deformation of the housing 7 via the support unit 4. However, in the portion where the stress relieving member 8 is provided, the first bonding surface 6a is not bonded to the major surface of the support unit 4. Thus, in this portion, the display panel 5 is not deformed in conformity with the deformation of the housing 7. Hence, as shown in FIG. 7B, the display panel 5 is separated from the support unit 4. This can significantly relieve the impact stress due to drop impact and the like, and prevent damage to, for example, the portion made of a brittle material (such as a glass substrate portion) provided in the display panel 5.

Figure 8:
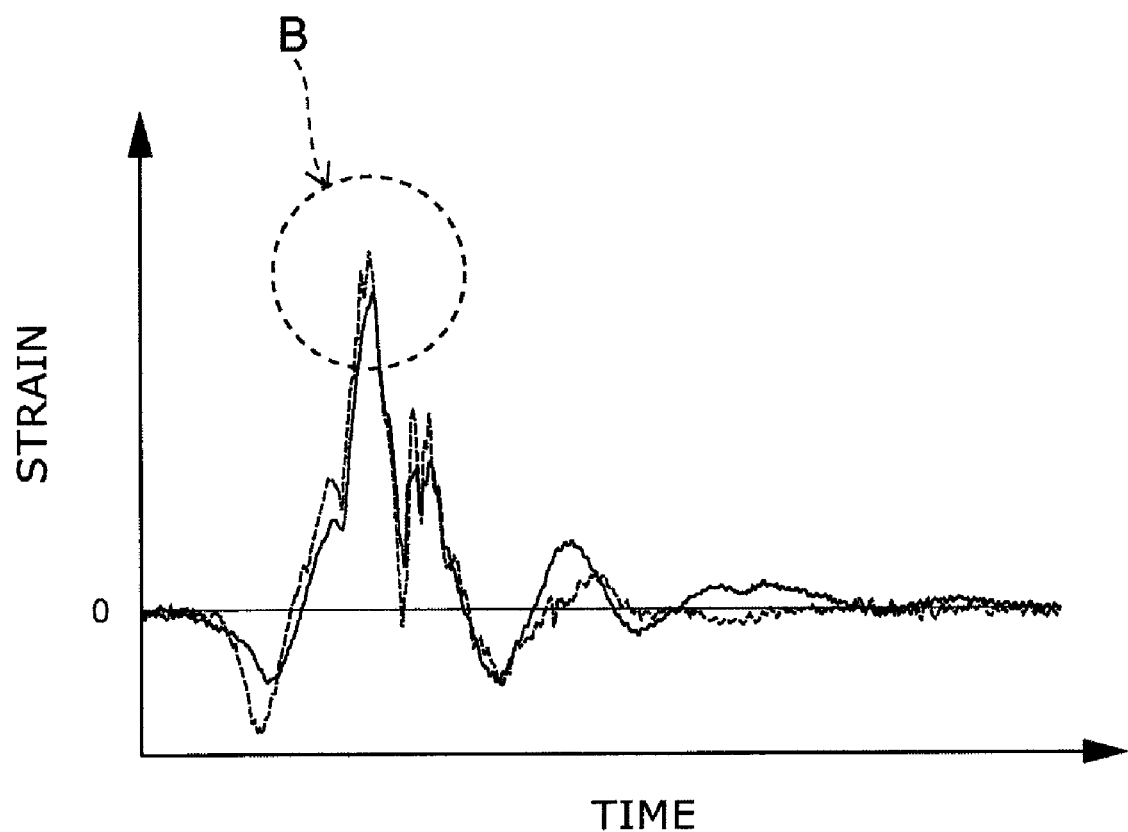
FIG. 8 is a graph for illustrating the effect of relieving the impact stress.

FIG. 8 is a graph for illustrating the effect of relieving the impact stress.

The dashed line in the figure represents the case of the holding structure according to the comparative example illustrated in FIG. 2, and the solid line in the figure represents the case of the holding structure according to this embodiment illustrated in FIG. 1. The vertical axis represents the strain of the display panel 5, and the horizontal axis represents time.

FIG. 8 shows the case where the electronic device 1 undergoes an impact that is expected to occur when the electronic device 1 is dropped from the hand of a standing user.

As seen from portion B in the figure, according to this embodiment, the strain of the display panel 5 can be reduced by approximately 12%. This means that the impact stress can be significantly relieved. Furthermore, three times or more durability was confirmed in the impact resistance test of repeating the same drop as in the case of FIG. 8.

Figure 9A:
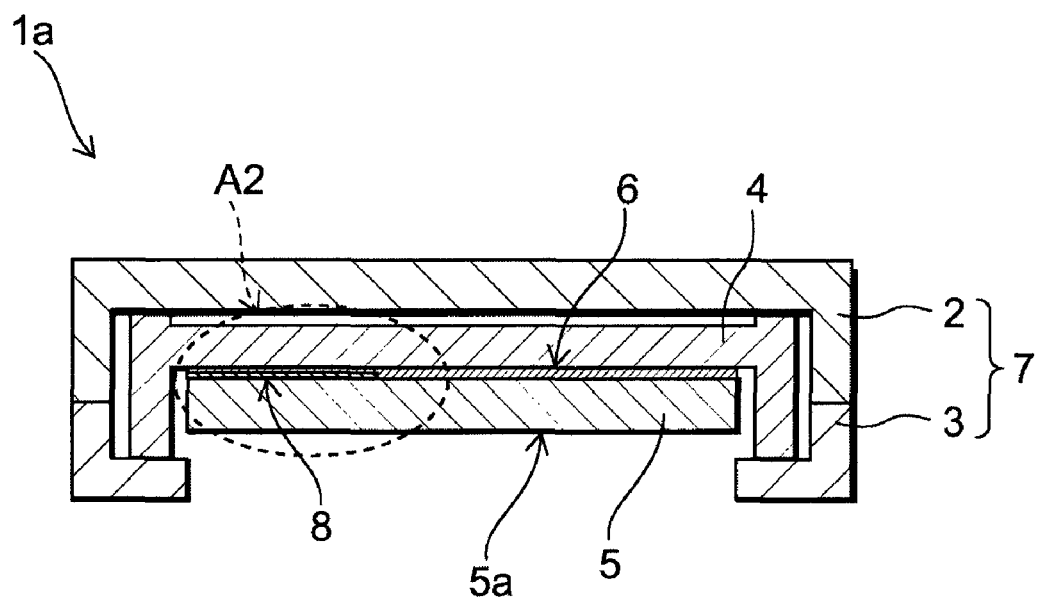
FIGS. 9A and 9B are schematic cross-sectional views for illustrating a holding structure for an electronic component according to a second embodiment.
Figure 9B:
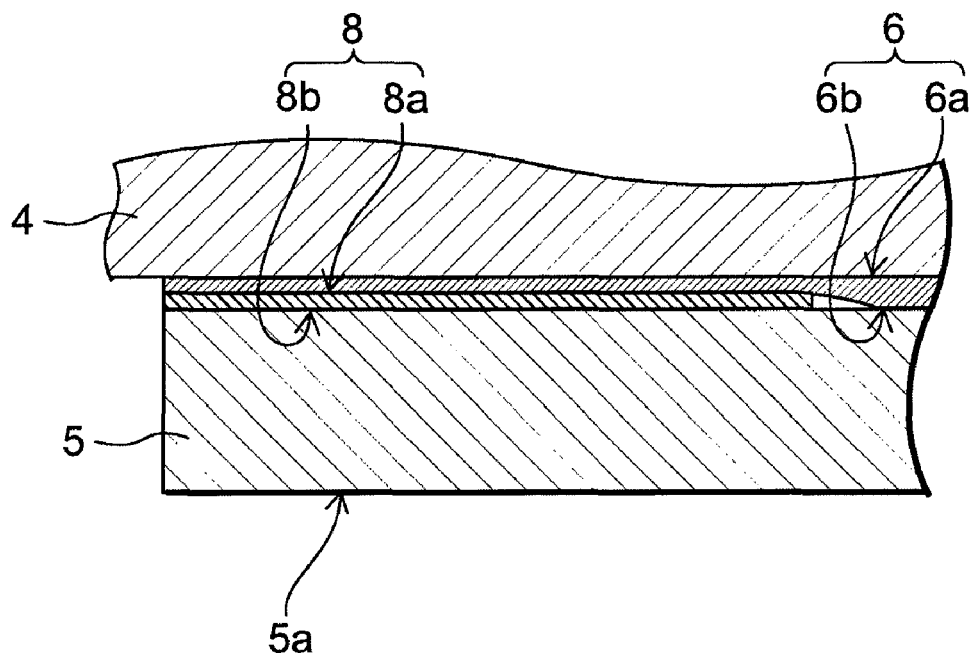

FIG. 9 is a schematic cross-sectional view for illustrating a holding structure for an electronic component according to a second embodiment. More specifically, FIG. 9A shows the holding structure for the electronic component, and FIG. 9B is a schematic enlarged view of portion A2 in FIG. 9A.

That illustrated in FIG. 9 is different from that illustrated in FIG. 1 in the position where the holding member 6 is provided. More specifically, in the electronic device 1a, the stress relieving member 8 is provided on part of the second bonding surface 6b. Hence, the second bonding surface 6b of the holding member 6 is bonded to the display panel 5 in its portion where the stress relieving member 8 is not provided. Here, because the thickness of the stress relieving member 8 is small, the stress relieving member 8 abuts the display panel 5 while the aforementioned portion of the second bonding surface 6b is bonded to the display panel 5. That is, in the portion where the stress relieving member 8 is provided, the second bonding surface 6b is not bonded to the display panel 5, but the display panel 5 abuts the support unit 4 via the stress relieving member 8 and the holding member 6.

Hence, even if the electronic device 1a undergoes an impact force due to drop and the like, in the portion where the stress relieving member 8 is provided, the display panel 5 is not deformed in conformity with the deformation of the housing 7. This can significantly relieve the impact stress due to drop impact and the like, and prevent damage to, for example, the portion made of a brittle material (such as a glass substrate portion) provided in the display panel 5.

Figure 10A:
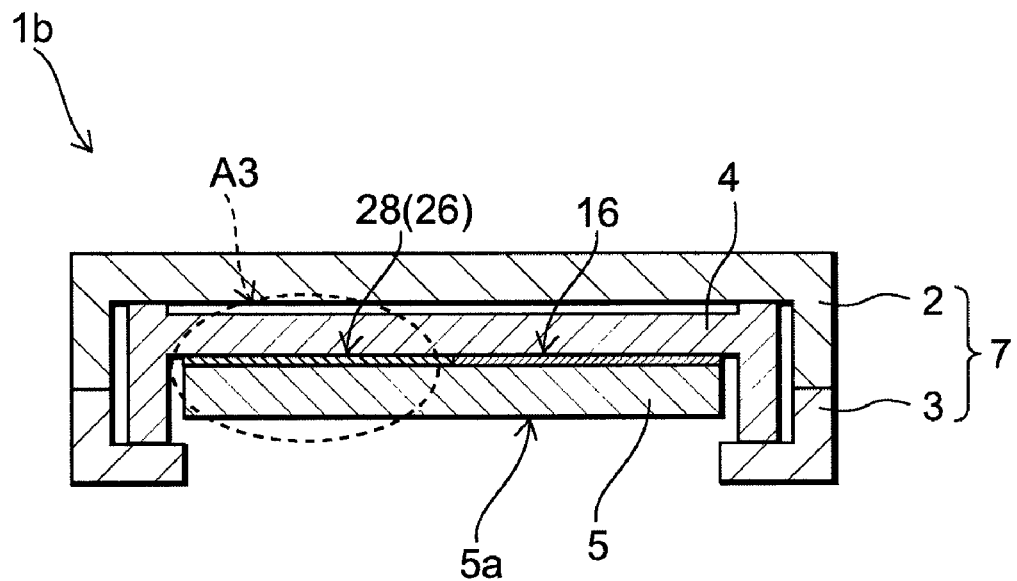
FIGS. 10A and 10B are schematic cross-sectional views for illustrating a holding structure for an electronic component according to a third embodiment.
Figure 10B:
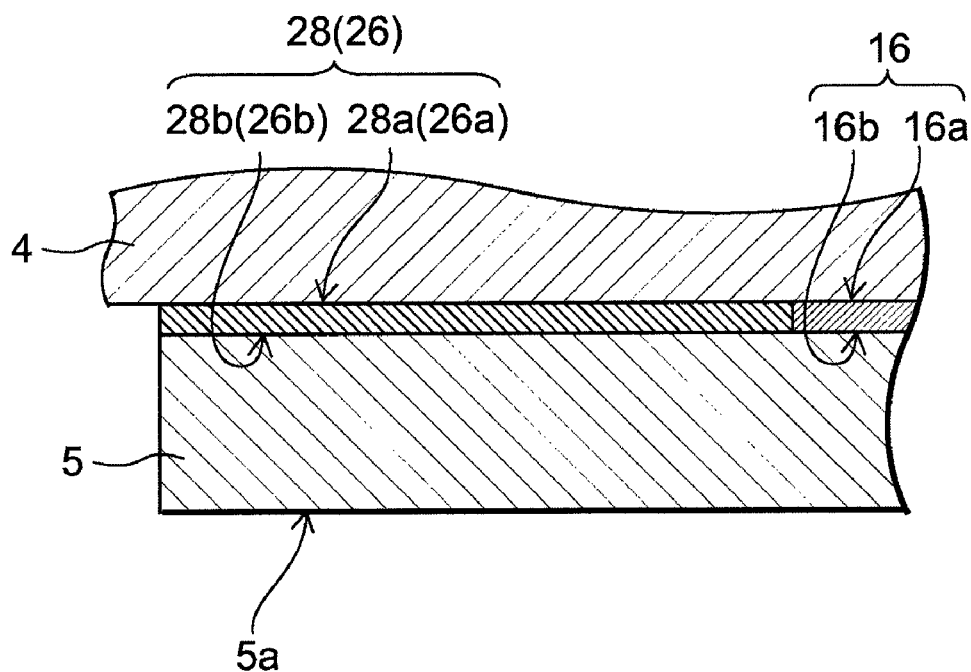

FIG. 10 is a schematic cross-sectional view for illustrating a holding structure for an electronic component according to a third embodiment. More specifically, FIG. 10A shows the holding structure for the electronic component, and FIG. 10B is a schematic enlarged view of portion A3 in FIG. 10A.

As shown in FIG. 10A, in the electronic device 1b, a holding member 16 is provided on part of the major surface of the display panel 5. A stress relieving member 28 is provided on the portion of the major surface of the display panel 5 where the holding member 16 is not provided.

The holding member 16 has a first bonding surface 16a and a second bonding surface 16b opposite to the first bonding surface 16a. The first bonding surface 16a is bonded to the major surface of the support unit 4, and the second bonding surface 16b is bonded to the major surface of the display panel 5 opposite to the display section 5a side, so that the display panel 5 is held on the major surface of the support unit 4. Here, in the case where the holding member 16 is a double-faced tape, its thickness can be approximately 0.1 mm.

The stress relieving member 28 can be a sheet-like member having a first surface 28a and a second surface 28b opposite to the first surface 28a. One of the first surface 28a and second surface 28b is a bonding surface, and the other is a non-bonding surface. Thus, one of the first surface 28a and the second surface 28b is bonded to the support unit 4 or the display panel 5, and the other abuts the support unit 4 or the display panel 5.

Also in this embodiment, in the portion where the stress relieving member 28 is provided, the display panel 5 is not deformed in conformity with the deformation of the housing 7. This can significantly relieve the impact stress due to drop impact and the like, and prevent damage to, for example, the portion made of a brittle material (such as a glass substrate portion) provided in the display panel 5.

Preferably, the thickness of the holding member 16 is generally the same as the thickness of the stress relieving member 28. Then, when a pressing force is applied to the display panel 5 from the display section 5a side, the display panel 5 can be supported generally evenly by the holding member 16 and the stress relieving member 28.

Alternatively, the stress relieving member 28 can be replaced by a holding member 26. The holding member 26 has a first bonding surface 26a and a second bonding surface 26b opposite to the first bonding surface 26a. The first bonding surface 26a is bonded to the major surface of the support unit 4, and the second bonding surface 26b is bonded to the major surface of the display panel 5 opposite to the display section 5a side, so that the display panel 5 is held on the major surface of the support unit 4.

The holding member 26 is more elastically deformable than the holding member 16. Here, in the case where the holding member 16 and the holding member 26 are both a double-faced tape or the like, the holding member 26 can be made more elastically deformable than the holding member 16 by using different types of base materials. For example, the holding member 16 can be a double-faced tape made of a hard base material such as polyester film, and the holding member 26 can be a double-faced tape made of a soft base material such as acrylic foam.

Thus, in the case of providing the holding member 16 and the holding member 26, the holding member 26 is elastically deformed in the thickness direction even if the housing 7 is deformed. Hence, the display panel 5 is not deformed in conformity with the deformation of the housing 7. This can significantly relieve the impact stress due to drop impact and the like, and prevent damage to, for example, the portion made of a brittle material (such as a glass substrate portion) provided in the display panel 5.

Preferably, the thickness of the holding member 16 is generally the same as the thickness of the holding member 26. Then, when a pressing force is applied to the display panel 5 from the display section 5a side, the display panel 5 can be supported generally evenly by the holding member 16 and the holding member 26.

Figure 11A:
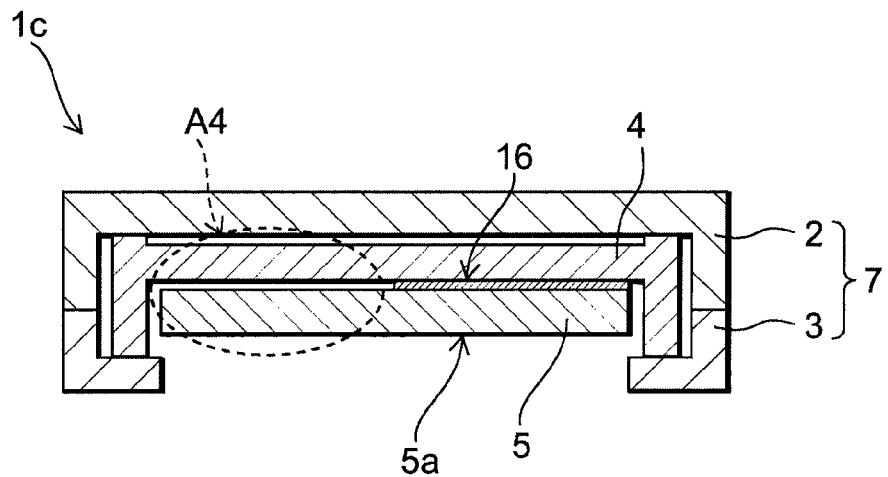
FIGS. 11A to 11C are schematic cross-sectional views for illustrating a holding structure for an electronic component according to a fourth embodiment.
Figure 11B:
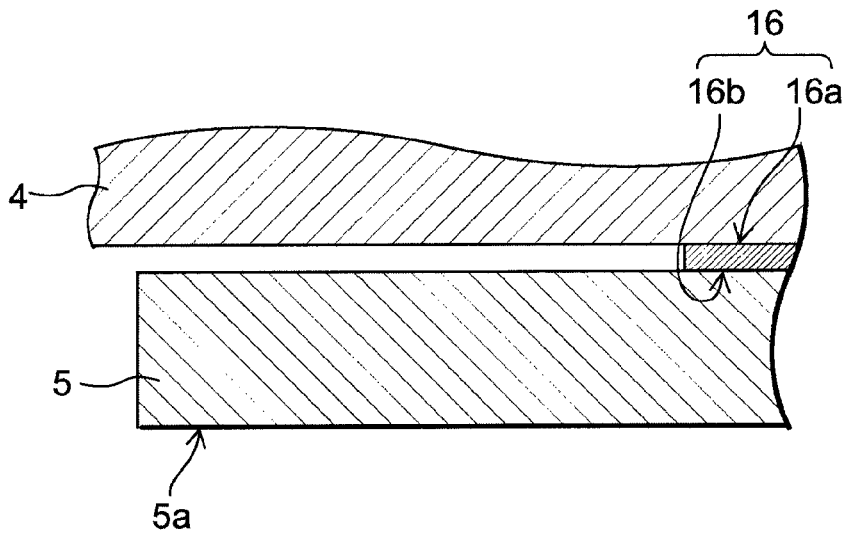
Figure 11C:
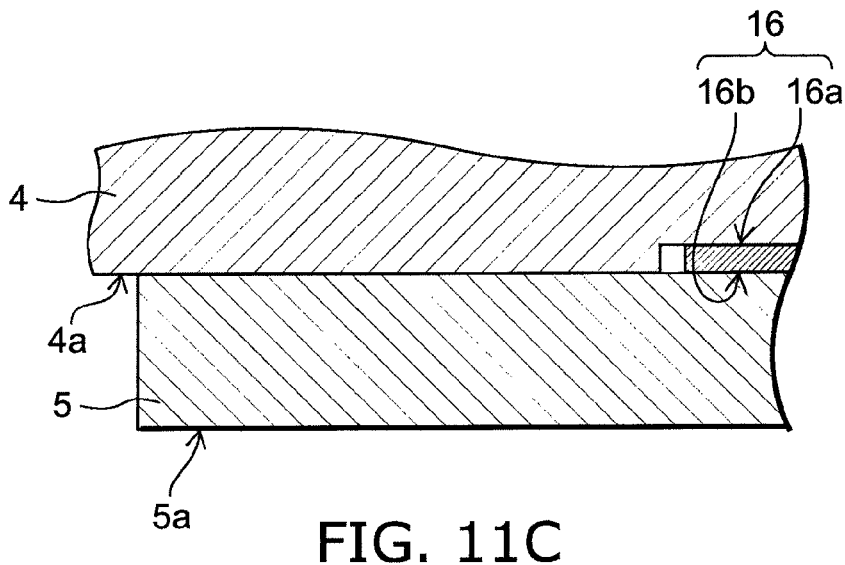

FIG. 11 is a schematic cross-sectional view for illustrating a holding structure for an electronic component according to a fourth embodiment. More specifically, FIG. 11A shows the holding structure for the electronic component, FIG. 11B is a schematic enlarged view of portion A4 in FIG. 11A, and FIG. 11C is a schematic enlarged view for illustrating a protrusion provided on the major surface of the support unit.

As shown in FIG. 11A, in the electronic device 1c, a holding member 16 is provided on one end surface side of the major surface of the display panel 5. However, nothing is provided on the portion of the major surface of the display panel 5 where the holding member 16 is not provided. That is, in the portion where the holding member 16 is not provided, the major surface of the display panel 5 is spaced from the major surface of the support unit 4, leaving a gap of the thickness of the holding member 16.

Also in this embodiment, in the portion where the holding member 16 is not provided, the display panel 5 is not deformed in conformity with the deformation of the housing 7. This can significantly relieve the impact stress due to drop impact and the like, and prevent damage to, for example, the portion made of a brittle material (such as a glass substrate portion) provided in the display panel 5.

In this case, when a pressing force is applied to the display panel 5 from the display section 5a side, the display panel 5 is warped. Thus, the major surface of the display panel 5 abuts the major surface of the support unit 4, and the display panel 5 is supported by the support unit 4. Hence, a load is applied to the display panel 5, but its effect can be reduced by decreasing the thickness of the holding member 16.

Alternatively, as shown in FIG. 11C, a protrusion 4a can be provided on the major surface of the support unit 4 to support the portion where the holding member 16 is not provided. It is also possible to provide the protrusion on the major surface of the display panel 5.

In the foregoing cases, a display panel 5 or other electronic component is provided inside the housing 7 via a support unit 4. However, the support unit 4 is not necessarily needed, but a display panel 5 or other electronic component can be provided directly on the inner wall of the housing 7, for example. Alternatively, the support unit 4 may have a multilayer structure, or may be provided inside the housing 7 via another member.

As illustrated above, one end surface side of the major surface of the display panel 5 or other electronic component is held by the holding member, and the other end surface side is not held. That is, a holding member for holding a display panel 5 (electronic component) is provided between the display panel 5 (electronic component) and the housing 7, wherein the holding member holds a region of the major surface of the display panel 5 (electronic component) located on a first end surface side, and does not hold a region on a second end surface side opposed to the first end surface side.

Alternatively, as in the case of providing the holding member 26 illustrated in FIG. 10, a first holding member (holding member 16) for holding a region of the major surface of the display panel 5 (electronic component) located on a first end surface side is provided between the display panel 5 (electronic component) and the housing 7, and a second holding member (holding member 26) for holding a region on a second end surface side opposed to the first end surface side is provided between the display panel 5 (electronic component) and the housing 7, wherein the second holding member (holding member 26) is more elastically deformable than the first holding member (holding member 16).

In this case, any end surface side of the major surface of the electronic component can be held (or more firmly held). However, it is preferable to hold (or more firmly hold) the portion located on the side which has a smaller amount of deformation when the housing 7 is deformed by impact and the like. Then, the portion located on the side which has a larger amount of deformation is not held (or the holding member is elastically deformed) so that the impact stress can be further reduced.

Next, a method for manufacturing an electronic device according to an embodiment of the invention is illustrated.

Figure 12:
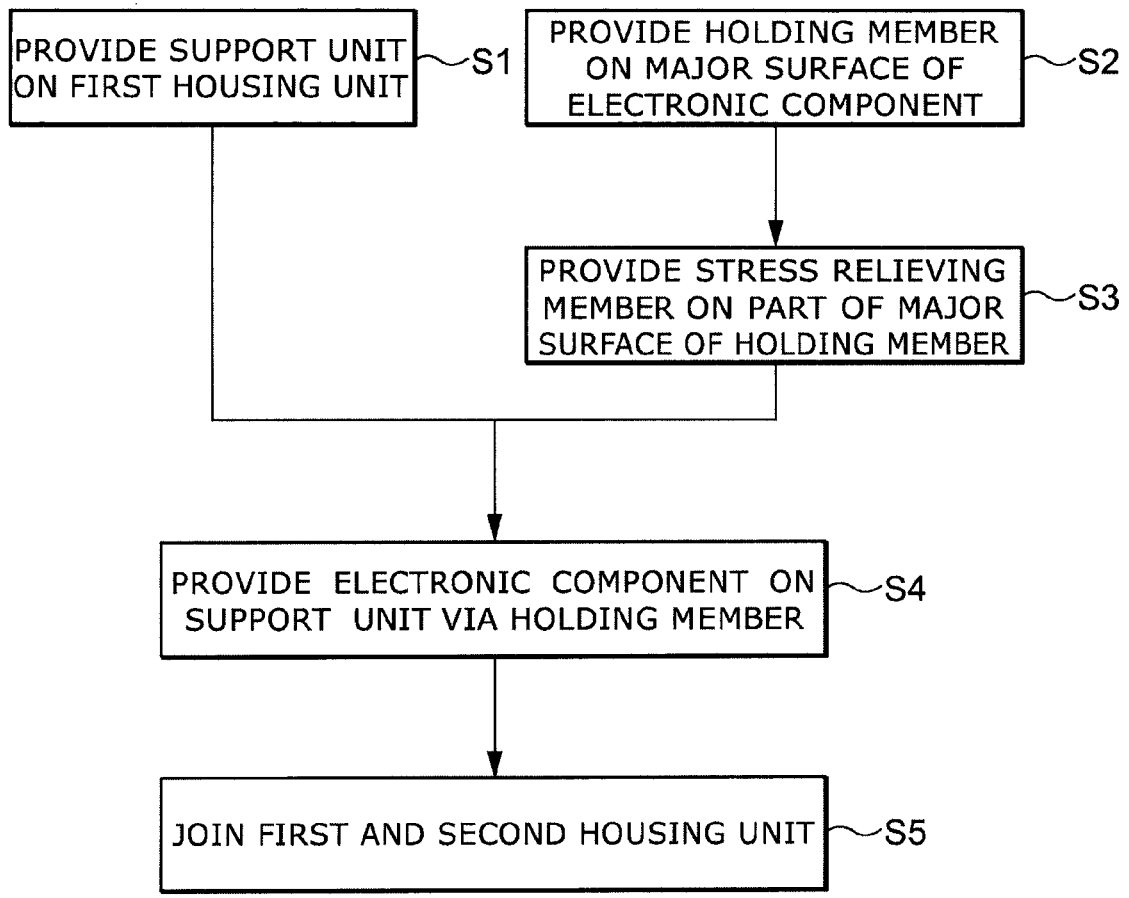
FIG. 12 is a flow chart for illustrating a method for manufacturing an electronic device according to an embodiment of the invention.

FIG. 12 is a flow chart for illustrating a method for manufacturing an electronic device according to an embodiment of the invention.

First, a support unit 4 is provided on the major surface of a first housing unit (housing unit 2) located on the inner side of the housing 7 (step S1).

Here, the support unit 4 can be provided on the aforementioned major surface of the housing unit 2 illustratively by adhesive bonding, screwing, or fitting.

On the other hand, a holding member 6 is provided on the major surface of a display panel 5 or other electronic component (step S2).

Here, the holding member 6 can illustratively be a double-faced tape.

Next, a stress relieving member 8 is provided on part of the major surface of the holding member 6 (step S3).

The stress relieving member 8 can illustratively be a sheet-like member, and can be provided so as to overlap the bonding surface of the double-faced tape serving as the holding member 6.

As illustrated in FIG. 10, in the case where a holding member 16 is provided on part of the major surface of the display panel 5 or other electronic component, a stress relieving member 28 is provided on the portion where the holding member 16 is not provided.

Next, the display panel 5 or other electronic component is provided on the major surface of the support unit 4 via the holding member 6 (step S4).

Next, after the display panel 5 or other electronic component is subjected to such treatment as wiring, the peripheries on the opening side of the first housing unit (housing unit 2) and the second housing unit (housing unit 3) are joined (step S5).

Here, the first housing unit (housing unit 2) and the second housing unit (housing unit 3) can be joined illustratively by adhesive bonding, screwing, or fitting.

As illustrated in FIG. 9, in the case where the stress relieving member 8 is provided between the major surface of the electronic component and the holding member 6, the stress relieving member 8 can be provided on the major surface of the display panel 5 or other electronic component in step S2, and the holding member 6 can be provided so as to cover the stress relieving member 8 in step S3.

As illustrated in FIG. 11, in the case where only the holding member 16 is provided on part of the major surface of the display panel 5 or other electronic component, there is no need to dispose the stress relieving member as illustrated in step S3.

For convenience of description, the holding member 6 is previously provided on the major surface of the display panel 5 or other electronic component in the foregoing illustration. However, the holding member 6 may be previously provided on the major surface of the support unit 4. As described above, in the case where the support unit 4 is not provided, the holding member 6 may be provided on the major surface of the housing unit 2 located on the inner side of the housing 7.

The embodiments of the invention have been described. However, the invention is not limited to the above description.

The above embodiments can be suitably modified by those skilled in the art, and such modifications are also encompassed within the scope of the invention as long as they fall within the spirit of the invention.

For example, the shape, dimension, material, number, layout and the like of each element in the electronic device 1, electronic devices 1a-1c and the like are not limited to those illustrated, but can be suitably modified.

For convenience of description, the holding member is illustratively made of a double-faced tape, but is not limited thereto. For example, the holding member can be an adhesive, or a junction layer made of rubber or the like. In this case, the holding member 6 and the holding member 16 can be a junction layer made of an epoxy adhesive or the like, and the holding member 26 illustrated in FIG. 10 can be a junction layer made of silicone rubber or the like.

In the above description, the electronic component is illustratively a display panel, but is not limited thereto. For example, it may be a circuit substrate. However, the invention is more advantageously applicable to those including a portion made of a brittle material (such as a glass substrate portion), which is susceptible to damage by impact.

The elements in the above embodiments can be combined with each other as long as feasible, and such combinations are also encompassed within the scope of the invention as long as they fall within the spirit of the invention.

The invention claimed is:

1. An electronic device comprising:
   a housing;
   an electronic component provided inside the housing;
   a holding member provided between an inner wall of the housing and the electronic component and configured to hold the electronic component,
      the holding member configured to hold a first region of a major surface of the electronic component located on a first end surface side, and not hold a second region of the major surface of the electronic component located on a second end surface side opposed to the first end surface side, and
      the holding member configured to extend on the second region; and
   a stress relieving member provided between the second region of the major surface and the holding member, the stress relieving member being configured to reduce holding force of the holding member.

2. The electronic device according to claim 1, wherein the stress relieving member is shaped like a sheet.

3. The electronic device according to claim 1, wherein the stress relieving member has a thickness dimension of not less than 50 μm and not more than 100 μm.

4. The electronic device according to claim 1, wherein the holding member includes a resin layer and bonding layers provided on both sides of the resin layer.

5. The electronic device according to claim 1, wherein the first region held by the holding member is located on a side where the housing has a smaller amount of deformation.

6. The electronic device according to claim 1, wherein the electronic component includes a portion made of a brittle material.

7. An electronic device comprising:
   a housing:
   an electronic component provided inside the housing; and
   a holding member provided between an inner wall of the housing and the electronic component and configured to hold the electronic component,
      the holding member configured to hold a first region of a major surface of the electronic component located on a first end surface side, and not hold a second region of the major surface of the electronic component located on a second end surface side opposed to the first end surface side, and
      the holding member configured to extend extends on the second region; and
   a stress relieving member provided between the holding member and a surface located inside the housing and opposed to the second region, the stress relieving member being configured to reduce holding force of the holding member.

8. The electronic device according to claim 7, wherein the stress relieving member is shaped like a sheet.

9. The electronic device according to claim 7, wherein the stress relieving member has a thickness dimension of not less than 50 μm and not more than 100 μm.

10. The electronic device according to claim 7, wherein the holding member includes a resin layer and bonding layers provided on both sides of the resin layer.

11. The electronic device according to claim 7, wherein the first region held by the holding member is located on a side where the housing has a smaller amount of deformation.

12. The electronic device according to claim 7, wherein the electronic component includes a portion made of a brittle material.

13. An electronic device comprising:
   a housing;
   an electronic component provided inside the housing;
   a first holding member provided between an inner wall of the housing and the electronic component and configured to hold a first region of a major surface of the electronic component located on a first end surface side; and
   a second holding member provided between the inner wall of the housing and the electronic component and configured to hold a second region of the major surface of the electronic component located on a second end surface side opposed to the first end surface side,
   the second holding member being more elastically deformable than the first holding member.

14. The electronic device according to claim 13, wherein the first holding member includes a resin layer and bonding layers provided on both sides of the resin layer.

15. The electronic device according to claim 13, wherein the second holding member includes a resin layer and bonding layers provided on both sides of the resin layer.

16. The electronic device according to claim 13, wherein the first region held by the holding member is located on a side where the housing has a smaller amount of deformation.

17. The electronic device according to claim 13, wherein the electronic component includes a portion made of a brittle material.

* * * * *

UNITED STATES PATENT AND TRADEMARK OFFICE
CERTIFICATE OF CORRECTION

| | | |
|---|---|---|
| PATENT NO. | : 8,124,890 B2 | Page 1 of 1 |
| APPLICATION NO. | : 12/361617 | |
| DATED | : February 28, 2012 | |
| INVENTOR(S) | : Morimoto | |

It is certified that error appears in the above-identified patent and that said Letters Patent is hereby corrected as shown below:

Claim 7, column 12, line 16, change "to extend extends" to --to extend--.

Signed and Sealed this
Seventh Day of August, 2012

David J. Kappos
*Director of the United States Patent and Trademark Office*